A. NITTINGER.
Sausage Machine.
No. 31,030.
Patented Jan. 1, 1861.
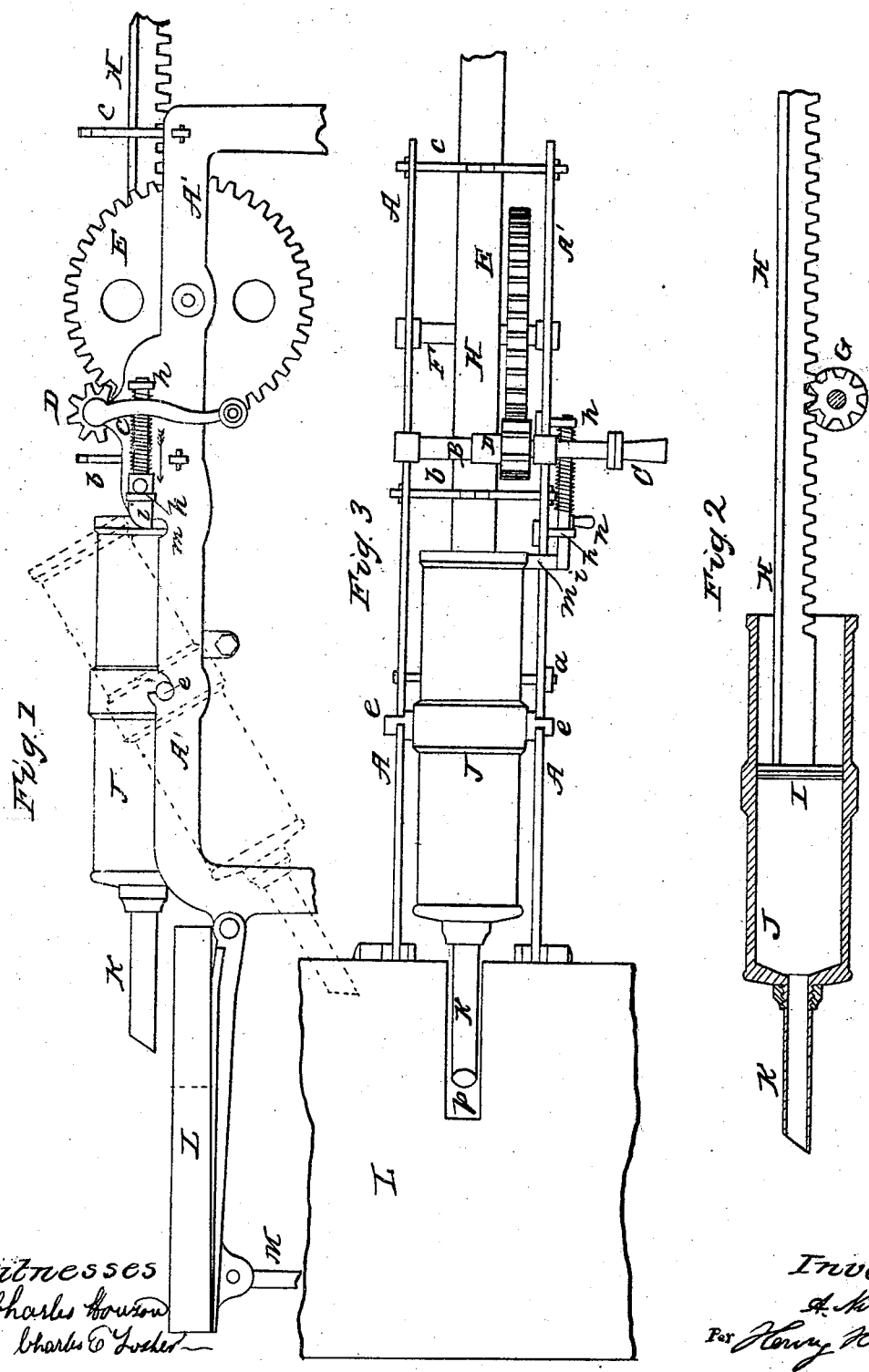

UNITED STATES PATENT OFFICE.

AUGUST NITTINGER, JR., OF PHILADELPHIA, PENNSYLVANIA.

SAUSAGE-STUFFER.

Specification of Letters Patent No. 31,030, dated January 1, 1861.

*To all whom it may concern:*

Be it known that I, AUGUST NITTINGER, Jr., of Philadelphia, Pennsylvania, have invented certain new and useful Improvements in Sausage-Machines; and I do hereby declare the following to be a full, clear, and exact description of the same, reference being had to the accompanying drawing and to the letters of reference marked thereon.

My invention relates to improvements in that class of sausage stuffing machines in which is used a tilting cylinder provided with a tube at one end and open at the opposite end for the reception of the piston which forces the sausage meat into the skins, and my invention consists, firstly, in a device for rendering the cylinder self locking when it assumes a horizontal position; secondly, in a hinged table with an oblong slot, so arranged in respect to the cylinder and its tube that while the table presents a suitable platform for the reception of the skins during the process of stuffing the cylinder with its tube is at liberty to tilt freely.

In order to enable others to make and use my invention, I will now proceed to describe its construction and operation.

On reference to the accompanying drawing which forms a part of this specification, Figure 1 is a side view of my improved sausage machine; Fig. 2, a longitudinal sectional view of part of the same, and Fig. 3 a ground plan.

Similar letters refer to similar parts throughout the several views.

A and A' are the two side frames of the machine, and are connected together at suitable points by the tie rod *a* and yokes *b* and *c*.

In projections on the opposite side frames turns a shaft B, furnished at one end with a suitable handle C, and having a pinion D, gearing into a cog wheel E, secured to a shaft F, which also turns in the opposite side frames, and which has a pinion G gearing into a rack H, the latter being guided by the yokes *b* and *c*, and being furnished at one end with a piston I adapted to the interior of the cylinder J. This cylinder is provided with trunnions *e*, *e*, one on each side, the said trunnions being adapted to recesses in the opposite frames, and being so situated that when the piston is removed from the cylinder, and when the latter is otherwise released, it will of itself tilt from a horizontal to a vertical position, the open end being uppermost. The opposite end of the cylinder is provided with a projection for receiving a tube K, which may be replaced by one of different size.

On the side frame A' is a latch *i* arranged to slide horizontally in suitable staples *h*, *h*, and provided with a coiled spring which tends to force the latch in the direction of the arrow. The outer end of the latch is rounded, so that as the cylinder is moved from a vertical to a horizontal position a projection *m* near the mouth of the cylinder will strike the rounded end of the latch, move the latter back until the projection has passed the point, when the latch through the action of its spring will recover its former position, and bearing on the top of the projection *m*, will retain the cylinder in a horizontal position. On drawing back the latch by means of its handle *n* the cylinder will be released and allowed to tilt to its former vertical position.

To the front ends of the opposite frames of the machine is hinged a table L the outer end of which is supported by a leg M, so hinged to the table that the latter will fall on moving the leg inward. An oblong slot *p* in the table allows for the free movement of the tube K when the cylinder is tilted.

The piston having been withdrawn from the cylinder, and the latter having tilted to a vertical position, its interior is nearly filled with sausage meat. After this the cylinder is depressed and locked to the frame by the device above described, when the piston is inserted into the mouth of the cylinder by turning the handle *c*. Prior to any further movement of the piston the skins which have to receive the meat are pushed over the tube K, and in this position they are held lightly in the hand. The handle C is now turned, causing the rack to move forward and the piston to push the meat through the tube into the skins which gradually leave the tube and spread themselves in folds over the table, the position of which in respect to the tube is such that the skins cannot be unduly stretched or broken during the process of stuffing.

When the machine is not required for use, the table may be folded down out of the way.

I claim as my invention and desire to secure by Letters Patent,

1. The cylinder J with its projection *m* in combination with the spring latch *i*, the latter being so constructed, and so arranged in respect to the said projection that the cylinder is rendered self-locking as herein set forth.

2. The hinged table L and its oblong slot p, when arranged on the frame in respect to the cylinder J and its tube K as and for the purpose herein set forth.

In testimony whereof, I have signed my name to this specification, in the presence of two subscribing witnesses.

AUGUST NITTINGER, Jr.

Witnesses:
HENRY HOWSON,
JOHN WHITE.